US006046767A

United States Patent [19]

Smith

[11] Patent Number: 6,046,767

[45] Date of Patent: Apr. 4, 2000

[54] LIGHT INDICATING METHOD AND APPARATUS TO ENCOURAGE ON-CAMERA VIDEO CONFERENCING

[75] Inventor: Randell B. Smith, Palo Alto, Calif.

[73] Assignee: Sun Microsystems, Inc., Palo Alto, Calif.

[21] Appl. No.: 08/886,060

[22] Filed: Jun. 30, 1997

[51] Int. Cl.$^{7}$ .............................. H04N 5/225; H04N 7/14

[52] U.S. Cl. .............................................. 348/207; 348/20

[58] Field of Search .................................... 348/207, 333, 348/115, 20, 169, 170, 722, 370, 371, 105, 341, 349, 744; 395/287, 281, 431; 352/137, 48, 138, 166

[56] References Cited

U.S. PATENT DOCUMENTS

| | | | |
|---|---|---|---|
| 2,816,475 | 12/1957 | Waller et al. | 352/48 |
| 3,116,365 | 12/1963 | Prescott | 348/20 |
| 3,532,815 | 10/1970 | Torok | 348/20 |
| 4,589,023 | 5/1986 | Suzuki et al. | 348/341 |
| 5,059,019 | 10/1991 | McCullough | 352/131 |
| 5,400,069 | 3/1995 | Braun et al. | 348/20 |
| 5,430,473 | 7/1995 | Beecher, II et al. | 348/20 |
| 5,638,122 | 6/1997 | Kawaguchi et al. | 348/349 |
| 5,666,153 | 9/1997 | Copeland | 348/20 |
| 5,671,008 | 9/1997 | Linn | 348/105 |
| 5,777,665 | 7/1998 | Mcnelley et al. | 348/20 |

OTHER PUBLICATIONS

Randall B. Smith, et al., "Preliminary experiments with a distributed, multimedia, problem solving environment," pp. 31–48, 1991, (Studies in Computer Supported Cooperative Work).

*Primary Examiner*—Wendy Garber
*Assistant Examiner*—Luong Nguyen
*Attorney, Agent, or Firm*—Finnegan, Henderson, Farabow, Garrett & Dunner, L.L.P.

[57] ABSTRACT

A light indicating apparatus for video conferencing provides a light that casts a shadow in a field of view of the video camera but provides light in an area surrounding the field of view to alert video conferencing participants when they leave the video camera's field of view.

23 Claims, 7 Drawing Sheets

300a

308

306

VIDEO CAMERA

304

310

302

200
202
204
206
208
210
212
214
216
218
220
LOCAL STATION
REMOTE STATION

LIGHT INDICATING METHOD AND APPARATUS TO ENCOURAGE ON-CAMERA VIDEO CONFERENCING

BACKGROUND OF THE INVENTION

The present invention relates generally to video conferencing. In particular, it relates to light indicating methods and apparatuses that provide feedback to local video conference participants that encourages on-camera video conferencing.

The ability to see and interact with conference participants is essential to conduct most business meeting. Often times, however, it is necessary to conduct conferences with remote participants, i.e., persons who cannot be physically at the conference. In this situation, video conference systems have proven to be an effective form of communication. Video conference systems allow the local and remote participants to see and interact with each other. FIG. 1 is a diagram showing how a conventional video conference system 100 provides communication between video conference stations. Video conference system 100 includes a plurality of video conferencing stations 102 connected through a video conference network 104. Video conference system 100 allows participants at each station 102 to view participants at the other stations 102.

FIG. 2 shows a video conference system 200 having two video conference stations, designated a local station 202 and a remote station 204. Local station 202 contains at least one local conference participant 206, a local video camera 208, and a local video monitor 210, each of which is represented with a frontal view and a profile view. Remote station 204 similarly contains a remote conference participant 212, a remote video camera 214, and a remote monitor 216, each of which is represented with a frontal view and a profile view. Local station 202 and remote station 204 are connected by a network 218, which can be, for example, a normal telephone system.

Video conference system 200 operates by having local video camera 208 transmit a picture of local conference participant 206 over network 218 to remote video monitor 216. Remote video monitor 216 displays the picture of local conference participant 206, which can be observed by remote conference participant 212. Substantially simultaneously, remote video camera 214 transmits a picture of remote conference participant 212 over network 218 to local video monitor 210. Local video monitor 210 displays the picture of remote conference participant 212, which can be observed by local conference participant 206.

Local station 202 and remote station 204 are typically arranged prior to the video conference so the video cameras are positioned to take a video picture of a particular field of view that the video conference participant desires to transmit to the other conference stations. FIG. 2 illustrates how a local video camera 208 can be arranged to encompass a field of view 220.

During a video conference lecture or presentation, a conference participant will often move during the conference, sometimes intentionally and sometimes unintentionally. Because of the static nature of a conventional video camera of a video conference system, a conference participant may move outside the pre-arranged field of view and either be completely or partially lost from sight by the remote conference participants.

Conventional video conferencing systems provide a "local feedback monitor" that allows the local conference participant to view himself on the local feedback monitor that corresponds to the display of the remote video monitor. Thus, when the local conference participant notices that he left the field of view, he can correct his position to remain in the field of view of the video camera. However, viewing oneself on the display of the local feedback monitor during the conference is unnatural. Additionally, the local conference participant would have to make a conscious choice to physically look at the local feedback monitor, which is disruptive to the video conference presentation. Therefore, it would be desirable to provide a feedback mechanism to alert local participants that they moved outside the established field of view without having to watch a local feedback monitor.

SUMMARY OF THE INVENTION

Methods and apparatus consistent with the invention provide light in a region surrounding a field of view of a video camera to provide a visual indication to a video conference participant when that participant leaves the field of view.

To attain the advantages and in accordance with the purpose of the invention, as embodied and broadly described herein, an indication apparatus for a video camera having a field of view consistent with the present invention comprises a source of light and a mechanism configured to cast a shadow to prevent the light from the source from shining in an area that substantially coincides with the field of view and to permit the light from the source to shine in an area that surrounds the field of view. Moreover, a video camera system consistent with the present invention comprises a video camera having a field of view, a source of light, and an opaque screen located between the field of view and the light source to prevent the light from the source from shining in an area that substantially coincides with the field of view and to permit the light from the source to shine in an area that surrounds the field of view. A method consistent with the present invention comprises selecting a field of view for a video camera, providing a source of light, and blocking the light from the source from shining in the selected field of view and permitting the light from the source to shine in an area surrounding the field of view.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

DESCRIPTION OF THE PREFERRED EMBODIMENTS

Reference will now be made in detail to the present preferred embodiments of the invention, examples of which are illustrated in the accompanying drawings. The matter contained in the description below or shown in the accompanying drawings shall be interpreted as illustrative, not limiting.

Methods and apparatus consistent with this invention can provide an indication to video conference participants that they have moved outside a field of view of a video camera by providing a shadow area that substantially coincides with a field of view of the video camera. When local video conference participants move outside the field of view of the video camera, they leave the shadow area and enter an area in which a light shines into their face. The light alerts the conference participant that he is leaving the field of view of the video camera and allows him to correct his position to remain in or return to the field of view of the video camera.

Figure 1:
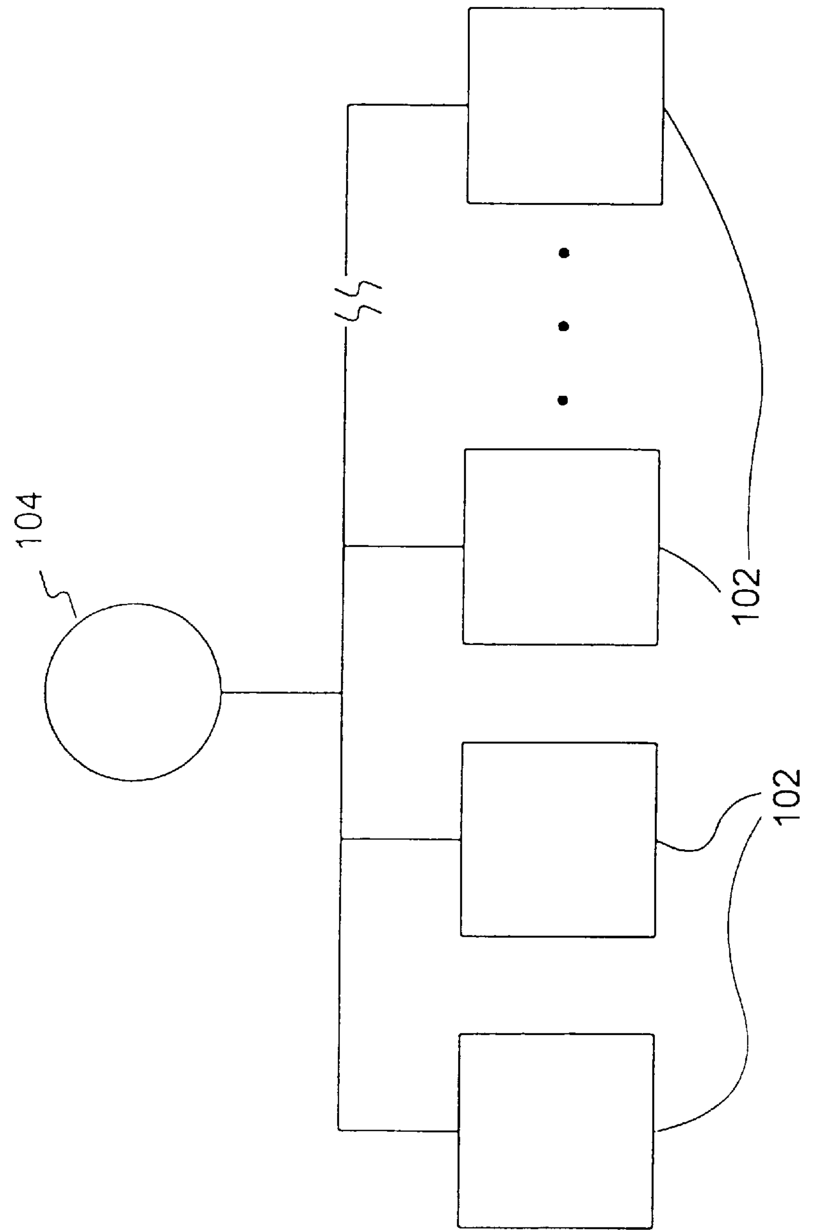
FIG. 1 is a representation of a conventional video conferencing system.
Figure 2:
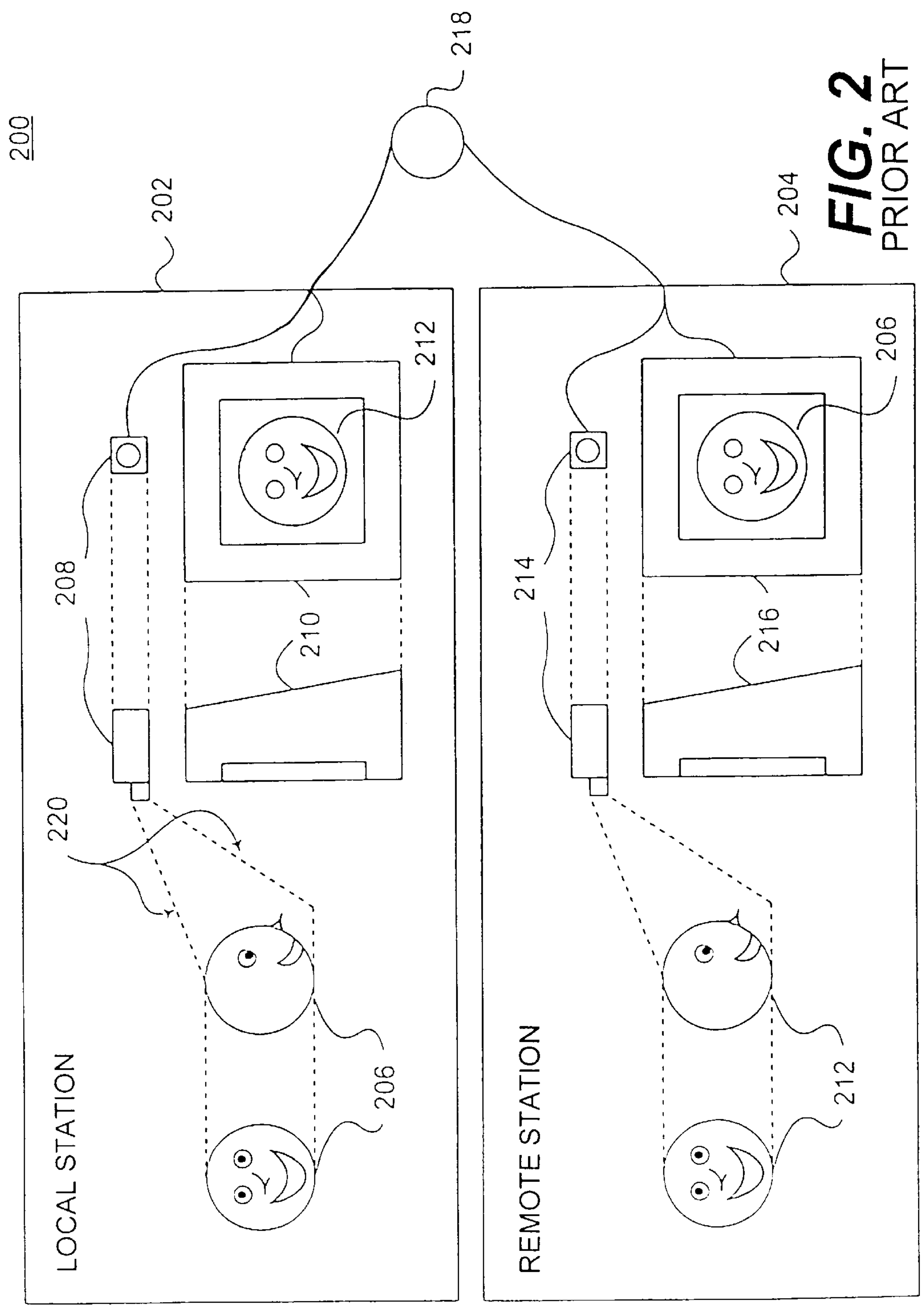
FIG. 2 is a representation of conventional video conference stations associated with a video conference system.
Figure 3A:
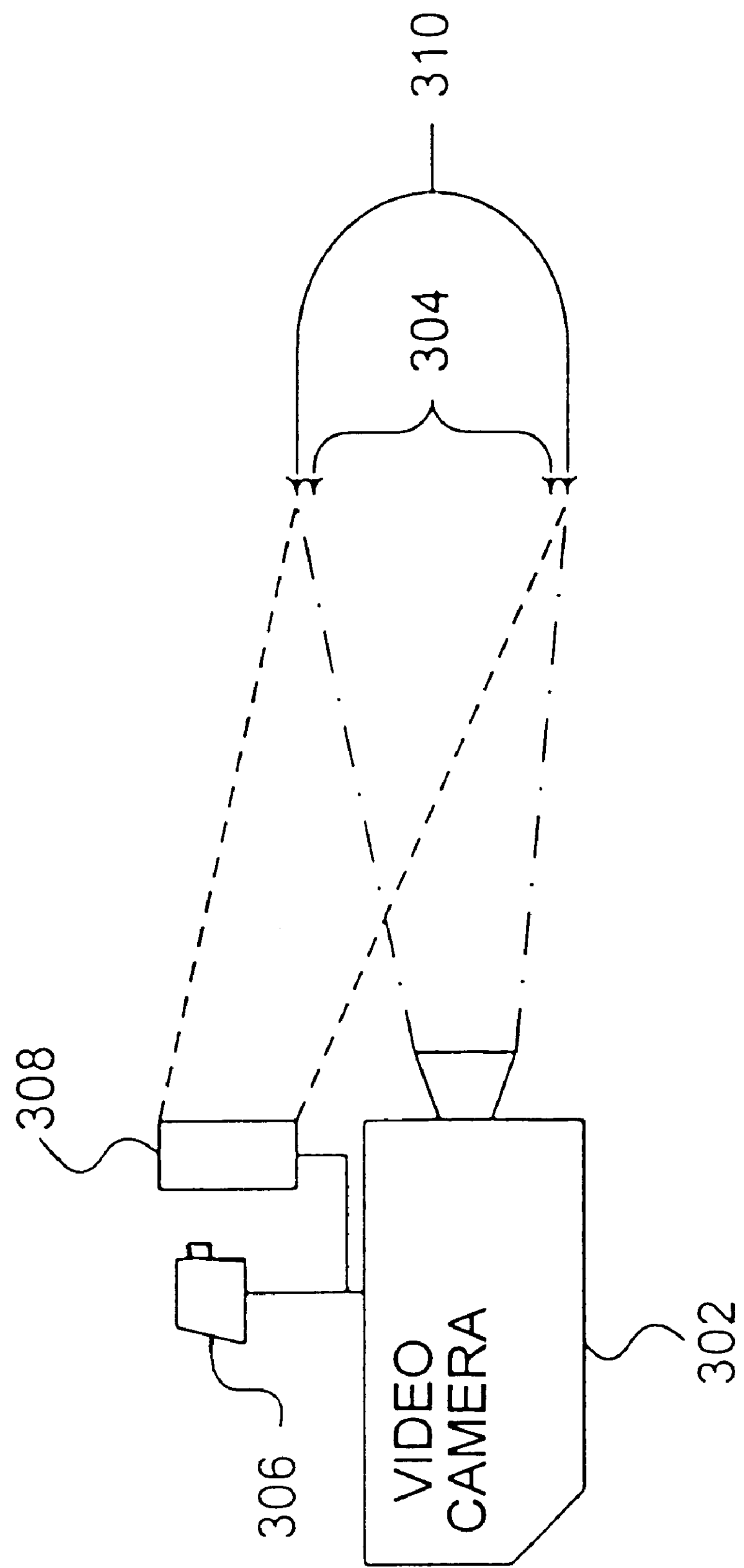
FIG. 3A is a representation of a video camera and an indication apparatus consistent with the present invention.

FIG. 3A shows a video light indicating system 300*a* consistent with the present invention. Video light indicating system 300*a*, for use with a video camera 302 having a prearranged field of view 304, includes a light source 306, for example, an incandescent bulb, a halogen bulb, a light emitting diode, etc., and an opaque screen 308. Light source 306 is preferably intermittent or blinking because a blinking light will more readily alert a conference participant that he has left or is leaving field of view 304 of video camera 302. Additionally, light source 306 is designed to be bright enough to be noticed by video conference participants but not so bright as to effect the video picture. Preferably, light source 306 is an intermittent light emitting diode.

Screen 308 is preferably completely opaque, but it may have translucent edges. When designed with translucent edges, screen 308 has an opaque center, a clear edge and a translucent portion between the opaque center and the clear edge. The translucent portion provides a gradual change from opaque to clear. Thus, as the conference participant moves closer to the edge of field of view 304 more light becomes visible through the translucent portion of screen 308. Furthermore, screen 308 should be designed and shaped to cast a shadow in an area that is substantially the same shape as field of view 304. Light source 306 and screen 308 are preferably mounted on video camera 302, but they may be separately mounted. Alternatively, light source 306 and screen 308 may be mounted in the body of video camera 302. When mounted in video camera 302, screen 308 would move and cover the lens of video camera 302 when video camera 302 was not being operated.

When placed behind screen 308, light source 306 in conjunction with screen 308 forms a shadow area 310. Shadow area 310 is designed to substantially coincide with field of view 304 such that the light from light source 306 only illuminates areas outside of shadow area 310. In other words, when video conference participants are in field of view 304, light from light source 306 is blocked from their view. When video conference participants leave any portion of field of view 304, the light from light source 306 is no longer blocked, but rather shines in their faces.

As can be seen from FIG. 3A, shadow area 310 is slightly skewed from field of view 304. This skew is easily compensated for by the shape and size of screen 308 and the placement of light source 306. In the preferred embodiment, the skew is compensated for by designing shadow area 310 to be slightly smaller than field of view 304. With a slightly smaller shadow area 310, video indicating system 300*a* provides an "early warning" to the participant that a significant portion of the anatomy of the conference participant is leaving field of view 304. Thus, when a local video participant moves outside of shadow area 310, light source 306 shines (or blinks) on the conference participant, providing an indication that the participant has left, or is about to leave, or a significant portion of the conference participant has left or is about to leave field of view 304 of video camera 302.

When shadow area 310 is designed to be slightly smaller than field of view 304 (or if the edges of screen 308 are translucent), it is possible for light source 306 to be bright enough to "over expose" a portion of the picture taken by video camera 302. This would white-out the borders of the video picture. In order to alleviate this problem, light source 306 is designed to be bright enough to be noticed by video participants but not so bright as to over expose the picture. A light emitting diode is one possible light source that is bright enough to be noticed by video conference participants but not so bright as to over expose the picture. If light source 306 is bright enough to over expose the video picture, light indicating system 300*a* would still function but the effectiveness would be reduced.

Figure 3B:
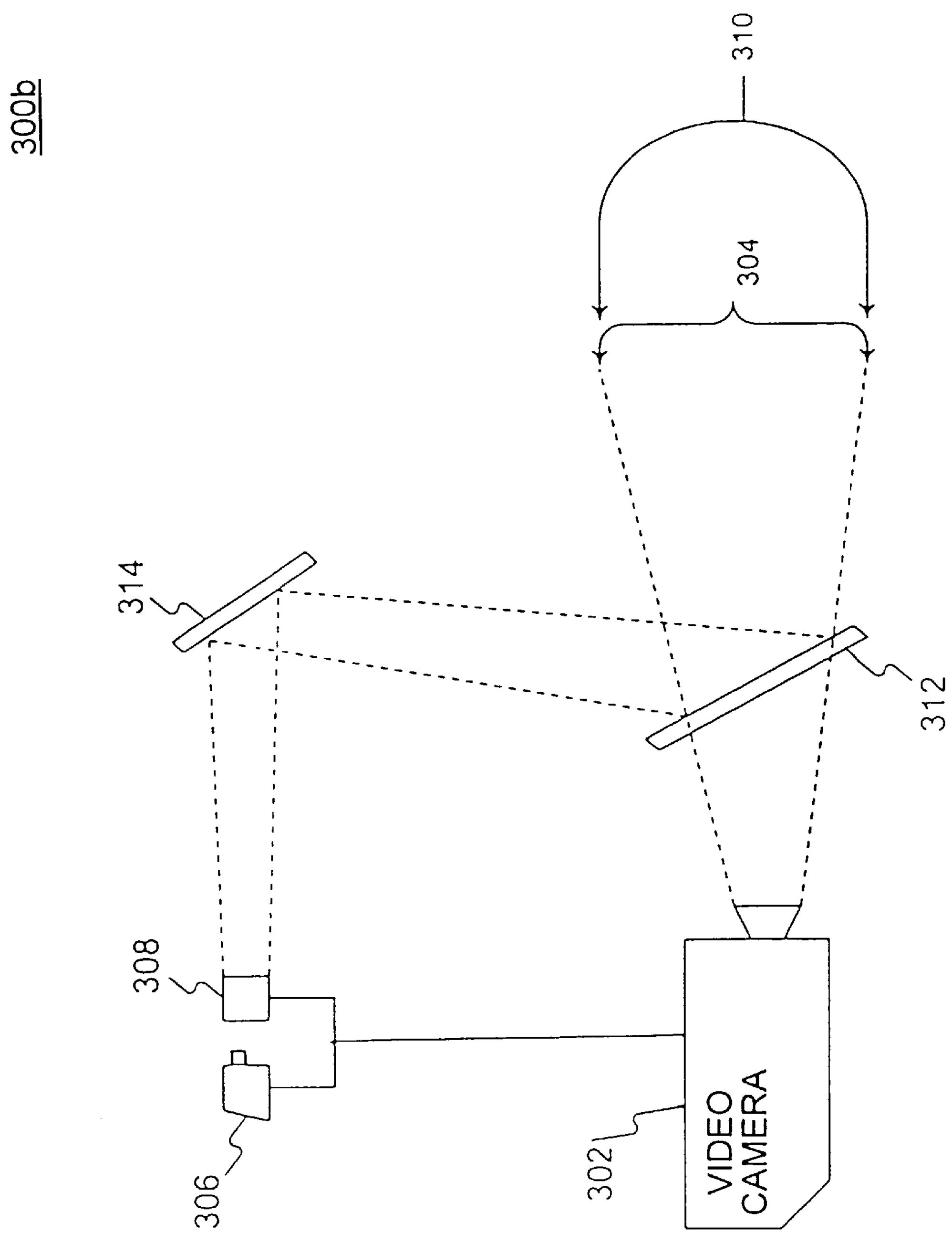
FIG. 3B is a representation of a video camera and an indication apparatus consistent with the present invention.

As an alternative to designing shadow area 310 to be slightly smaller than field of view 304, a video light indication system could be designed using mirrors to eliminate the skew between shadow area 310 and field of view 304. FIG. 3B shows a video light indication system 300*b* constructed using two mirrors 312 and 314. In this construction, a half-silvered mirror 312, or equivalent, would be placed in front of video camera 302. A second mirror 314 would be placed above half-silvered mirror 312. Light source 306 would shine on opaque screen 308 and cast a shadow on mirror 314, which would be reflected to mirror 312. The shadow would reflect off mirror 312 to form shadow area 310, which substantially coincides with field of view 304. When the total optical distance from light source 306 and opaque screen 308 to mirror 312 equals the total optical distance from video camera 302 to mirror 312, the optical effect is equivalent to designing light source 306 and opaque screen 308 in the center of video camera 302. Thus, field of view 304 would not be skewed from shadow area 310.

Figure 4:
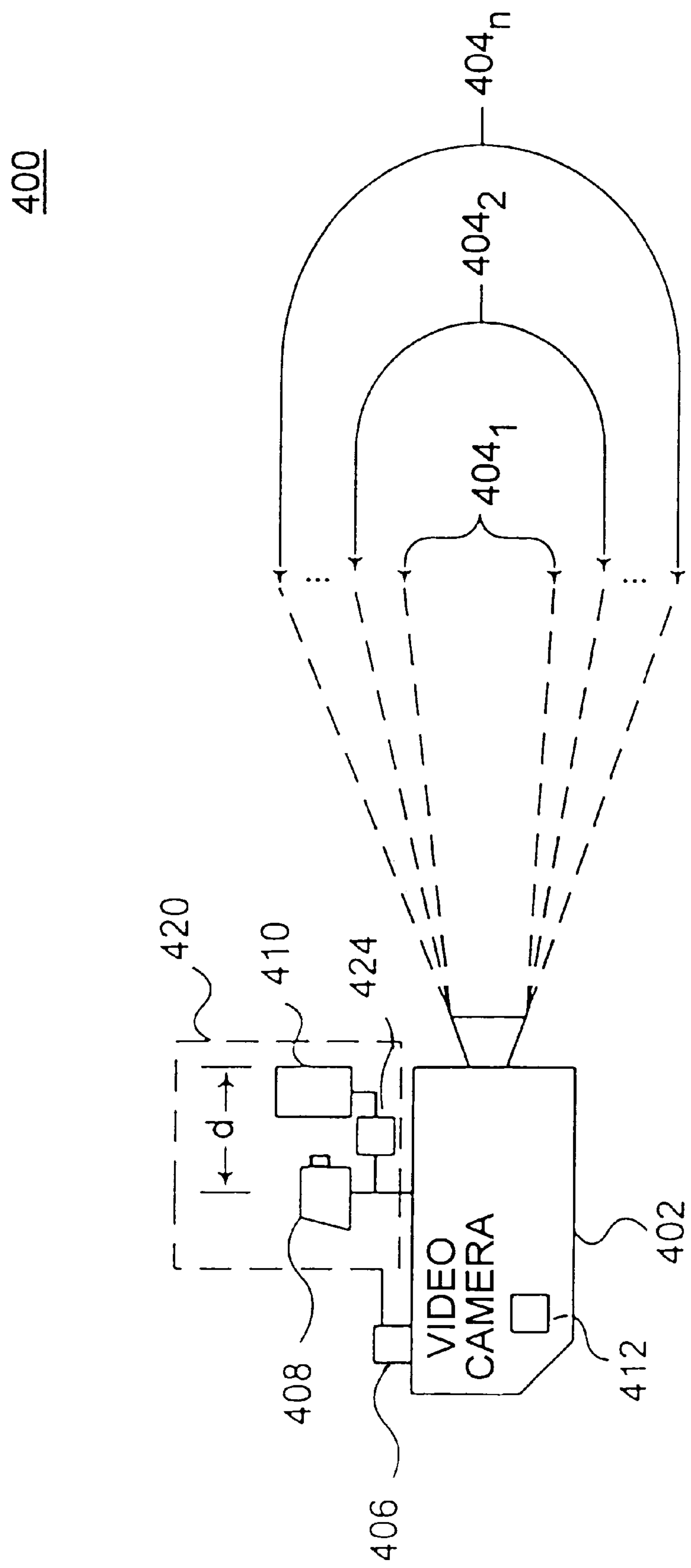
FIG. 4 is a representation of a video camera with a plurality of fields of view and an indicating apparatus consistent with the present invention.

While field of view 304 may remain constant, many video cameras can achieve different fields of view based on various features of video camera 302, for example, zoom settings. FIG. 4 represents a video camera 402 having several fields of view $\mathbf{404}_1$, $\mathbf{404}_2$, . . . , $\mathbf{404}_n$. Video camera 402 can automatically select a field of view (i.e., through, for example, conventional autofocus or autozoom mechanisms, not shown) or video camera 402 can be provided with a selector 412 to manually select the field of view.

To operate properly with fields of view $\mathbf{404}_n$, a system consistent with this invention has a field of view detector 406, coupled to camera 302, that determines which field of view $\mathbf{404}_n$ has been either automatically or manually selected. A shadow producing system 420, including a light source 408, an opaque screen 410, and adjuster 424, would then produce the shadow area that coincides with the field of view $\mathbf{404}_n$ that detector 406 detected. More particularly, adjuster 424 creates different shadow areas by increasing or decreasing the distance d between light source 408 and screen 410 based upon which field of view detector 406 detects. As d increases, the shadow area decreases, and vice versa.

Detector 406 could be, for example, a mechanical linkage between selector 412 and adjuster 424. Detector 406 would detect a change in selector 412, which corresponds to selecting a new field of view, and cause adjuster 424 to adjust the distance d. The linkage would be calibrated so the shadow area would coincide with the new field of view. Alternatively, detector 406 could be a microprocessor that receives a signal from selector 412 and sends an adjustment signal to adjuster 424. The adjustment signal would cause adjuster 424 to adjust the distance d so that the shadow area would coincide with the field of view.

Figure 5:
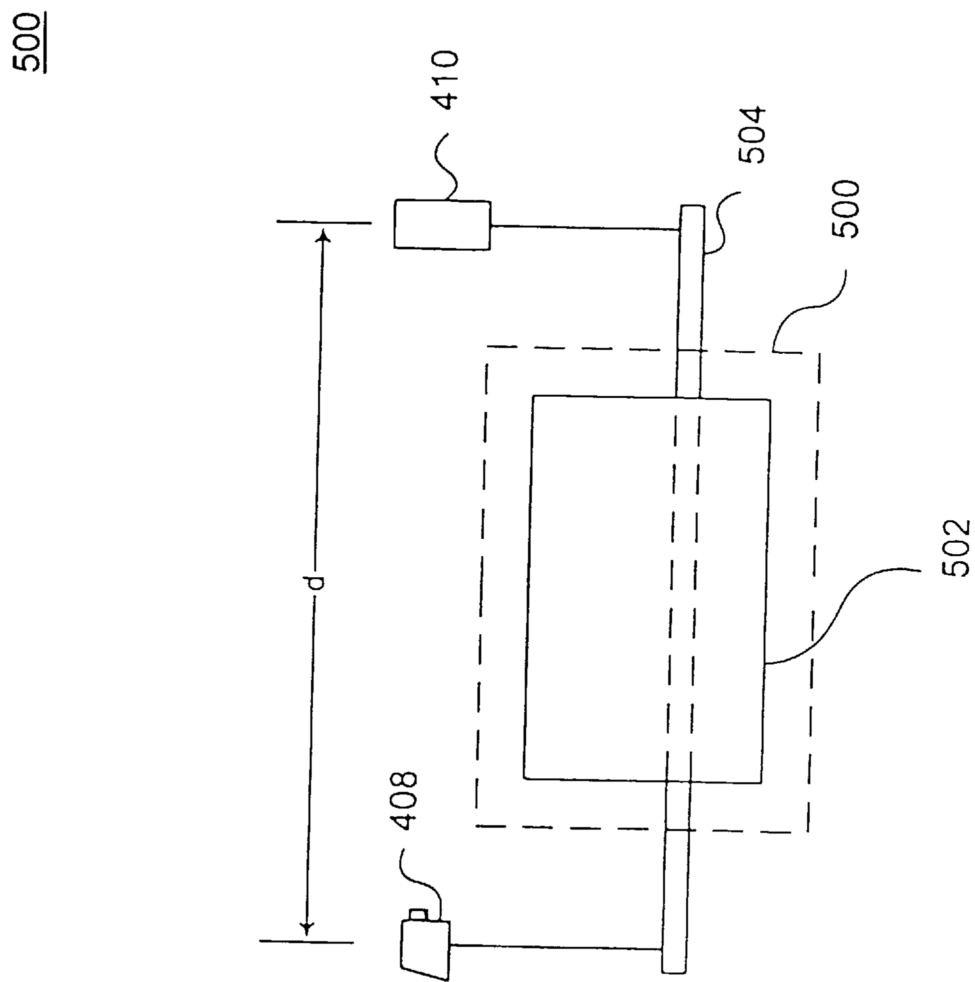
FIG. 5 is a representation of a motor and connector used to adjust a distance between a light source and an opaque screen consistent with the present invention.

FIG. 5 shows an adjustment mechanism 500 including an adjustment motor 502 and a connector 504 that connects light source 408 and screen 410 that can act as adjuster 424. Adjustment motor 502 is calibrated to move connector 504 and change the distance d between light source 408 and screen 410 to ensure the shadow area substantially coincides with the field of view. Adjustment motor 502 could be a separate motor dedicated to moving light source 408 or screen 410, or could be combined with other motors of video camera 402, such as, for example, adjustment motor 502 could operate the zoom setting and move connector 504.

Figure 6:
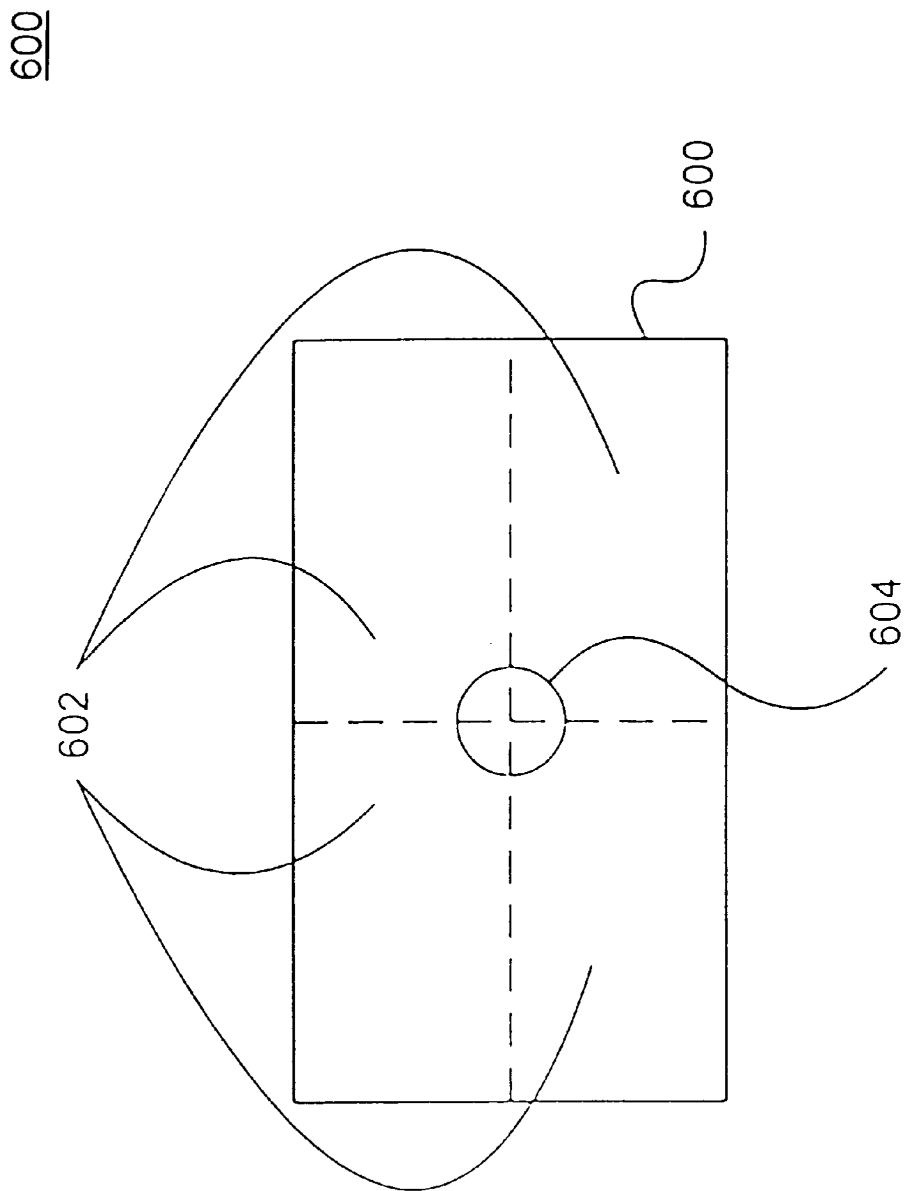
FIG. 6 is a representation of an opaque screen with an adjustable portion consistent with the present invention.

As an alternative to system 420, the distance d between light source 406 and screen 408 may be held constant and the size of the opaque screen could be changed. FIG. 6 shows an opaque screen 600 capable of casting several shadow areas that coincide with fields of view $\mathbf{404}_n$ by altering the size of screen 600. In this embodiment, screen 600 is constructed with variable portions 602. Thus, the shadow areas are obtained by expanding and contracting variable portions 602. A screen motor 604 may be calibrated to automatically change the size of screen 600 based upon, for example, zoom setting of video camera 402 such that the shadow areas coincide with fields of view $\mathbf{404}_n$. Again, screen motor 604 could be a dedicated motor or subsumed into the function of some other motor, such as the zoom motor.

It will be apparent to those skilled in the art that various modifications and variations can be made in the methods and apparatus consistent with the present invention without departing from the scope or spirit of the invention. Other modification will be apparent to those skilled in the art from consideration of the specification and practice of the invention disclosed herein. The specification and examples should be considered as exemplary only, with the true scope and spirit of the invention being indicated by the following claims.

What is claimed is:

1. An indicating apparatus for a video camera having a field of view comprising:

a source of light; and a mechanism configured to cast a shadow to prevent the light from shining in an area that substantially coincides with the field of view and to permit the light to shine in an area that surrounds the field of view, said mechanism including a light blocker and a mechanism for changing the size of the light blocker.

2. The indicating apparatus of claim 1 wherein the mechanism configured to cast a shadow includes:

a mechanism configured to change a distance between the light source and the mechanism configured to cast a shadow.

3. The indicating apparatus of claim 1 wherein the mechanism configured to cast a shadow includes an opaque screen.

4. The indicating apparatus of claim 1 wherein the light source is a light emitting diode.

5. The indicating apparatus of claim 1 wherein the light source is a blinking light source.

6. An indicating apparatus for use with a video camera having a field of view comprising:

a source of light;

an opaque screen located between the field of view and the source to prevent the light from shining in an area that substantially coincides with the field of view and to permit the light to shine in an area that surrounds the field of view; and a mechanism for changing the size of the opaque screen.

7. The indicating apparatus of claim 6 wherein the opaque screen includes an opaque region, a translucent region surrounding the opaque region, and a transparent region surrounding the translucent region.

8. The indicating apparatus of claim 6 including a plurality of mirrors located between the opaque screen and the field of view.

9. The indicating apparatus of claim 8 wherein at least one mirror is a half-mirror and is located between a video camera and a field of view.

10. An indicating apparatus for a video camera having a variable size field of view comprising:

a source of light;

an opaque screen located between the field of view and the source of light; and a positioner coupled to the video camera to detect variations in the size of the field of view and to change the distance between the source of light and the opaque screen based on the detected variation to prevent the light from shining in an area that substantially coincides with the field of view and to permit the light to shine in an area that surrounds the field of view.

11. The light indicating apparatus of claim 10 wherein the positioner includes a motor coupled to at least one of the source of light and the opaque screen to change the distance between the source of light and the opaque screen.

12. A light indicating apparatus for a video conference system including a video camera having a variable size field of view comprising:

a source of light;

a variable size opaque screen located between the field of view and the source of light; and a control device coupled to the video camera to detect the size of the field of view and to control the size of the opaque screen to prevent the light from shining in an area that substantially coincides with the field of view and to permit the light to shine in an area that surrounds the field of view.

13. The indicating apparatus of claim 12 wherein the control device includes a motor coupled to the variable size opaque screen to vary the size of the opaque screen.

14. A video camera system comprising:

a video camera having a field of view;

a source of light;

an opaque screen located between the field of view and the source of light to prevent the light from shining in an area that substantially coincides with the field of view and to permit the light to shine in an area that surrounds the field of view; and a mechanism for changing the size of the opaque screen.

15. A video camera system comprising:

a video camera having a variable size field of view;

a light source;

an opaque screen located between the field of view and the light source;

a positioner coupled to the video camera to detect variations in the size of the field of view and to change the distance between the source of light and the opaque screen based on the detected variation to prevent the light from shining in an area that substantially coincides with the field of view and to permit the light to shine in an area that surrounds the field of view.

16. A video camera system comprising:

a video camera having a variable size field of view;

a selector for selecting the field of view;

a source of light;

an opaque screen located between the field of view and the source of light; and a positioner coupled to the video camera to change the distance between the source of light and the opaque screen based on the selected field of view to prevent the light from shining in an area that substantially coincides with the field of view and to permit the light to shine in an area that surrounds the field of view.

17. A video camera system comprising:

a video camera having a variable size field of view;

a source of light;

a variable size opaque screen located between the field of view and the light source; and a control device coupled to the video camera to detect the size of the field of view and to control the size of the opaque screen to prevent the light from shining in an area that substantially coincides with the field of view and to permit the light to shine in an area that surrounds the field of view.

18. A video camera system comprising:

a video camera having a variable size field of view;

a selector for selecting the field of view;

a light source;

a variable size opaque screen located between the light source and the field of view; and a control device coupled to the video camera to control the size of the opaque screen based on the selected field of view to prevent the light from shining in an area that substantially coincides with the field of view and to permit the light to shine in an area that surrounds the field of view.

19. A method for video conferencing comprising the steps of:

selecting a field of view for a video camera;

providing a source of light; and blocking light from the source from shining in an area substantially coinciding with the selected field of view and permitting the light from the source to shine in an area surrounding the field of view, wherein the blocking step includes varying the size of an opaque screen.

20. The method of claim 19 wherein providing a source of light step includes providing a blinking source of light.

21. The method of claim 19 wherein the blocking includes positioning the opaque screen.

22. The method of claim 21 wherein the blocking step comprises:

detecting changes in the selected field of view; and changing the distance between the provided source of light and the opaque screen.

23. The method of claim 22 wherein the blocking step comprises:

detecting changes in the selected field of view.

* * * * *

UNITED STATES PATENT AND TRADEMARK OFFICE
CERTIFICATE OF CORRECTION

PATENT NO. : 6,046,767

DATED : April 4, 2000

INVENTOR(S) : Randall B. Smith

It is certified that error appears in the above-identified patent and that said Letters Patent is hereby corrected as shown below:

Title page, item [75], inventor: change "Randell" to --Randall--.

Signed and Sealed this

Sixth Day of February, 2001

Attest:

Q. TODD DICKINSON

Attesting Officer

*Director of Patents and Trademarks*